(No Model.)
S. H. MITCHELL.
COOKING VESSEL.
No. 457,208. Patented Aug. 4, 1891.
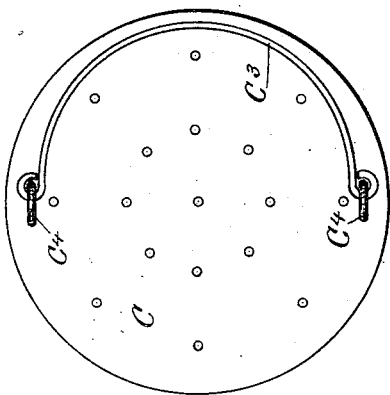
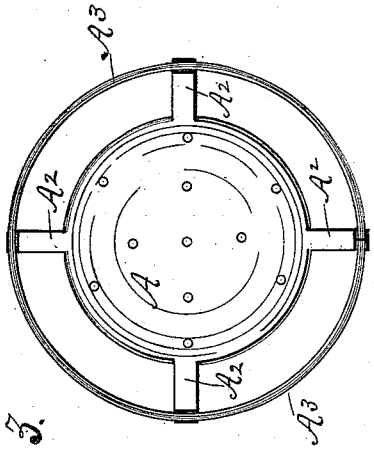
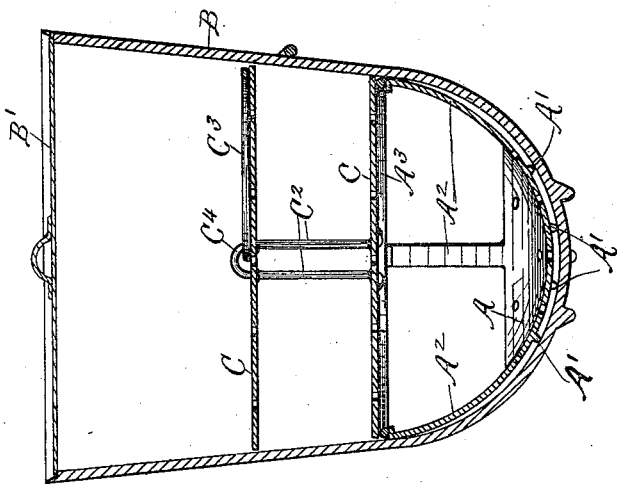
Witnesses:
Frank C. Curtis
John T. Booth
Inventor:
Sophia H. Mitchell
by Geo. A. Mosher
Atty.

UNITED STATES PATENT OFFICE.

SOPHIA H. MITCHELL, OF WEST TROY, NEW YORK.

COOKING-VESSEL.

SPECIFICATION forming part of Letters Patent No. 457,208, dated August 4, 1891.

Application filed October 6, 1890. Serial No. 367,272. (No model.)

*To all whom it may concern:*

Be it known that I, SOPHIA H. MITCHELL, a citizen of the United States, residing at West Troy, county of Albany, and State of New York, have invented certain new and useful Improvements in Cooking-Vessels, of which the following is a specification.

My invention relates to such improvements; and it consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1 of the drawings is a vertical central section of a kettle or cooking-vessel provided with my improved device. Fig. 2 is a top plan view of the removable tray. Fig. 3 is a top plan view of the bottom receptacle detached.

My improved cooking-vessel is adapted for use in cooking various articles of food which require to be boiled or steamed.

In cooking pot-pies, dumplings, &c., it is essential that the layers of dough should be kept separate from each other, for if one layer is placed upon another the under layer will not rise. It is also desirable in cooking meat and vegetables of various kinds in the same kettle to keep the various articles separate from each other; also, when meats or vegetables are in contact with the bottom of a kettle they are liable to be scorched and burnt in cooking if the water should nearly all evaporate.

My improved device is especially adapted for use in cooking meat and vegetables or pot-pie at the same time, and comprises a removable receptacle resting upon the bottom of an inclosing vessel and a removable tray supported by such receptacle within the vessel. The receptacle consists of a plate A, made, preferably, of perforated sheet metal and adapted to fit the bottom of the vessel B. It is provided on its under side with the spurs or feet A', which support the plate a short distance from and parallel to the bottom of the vessel. The plate is also provided with the arms $A^2$, extending upward from its periphery and conforming to the shape of the interior of the vessel. The arms $A^2$ are joined together by the wire hoop $A^3$, to which the upper ends of the arms are soldered. This wire and the upper end of arms $A^2$ fit the vessel, whereby the latter partially support said arms against downward pressure.

Superimposed upon and supported by the arms $A^2$ is a tray composed of two perforated plates C C, secured together by the curved wires $C^2$, to each of which both plates are soldered. The bail $C^3$ is secured to the tray through the ears $C^4$, formed by bends in the wires $C^2$.

The vessel may be provided with the lid or cover B'.

In using my improved device to cook meat and vegetables at the same time the meat is placed upon the bottom plate A, which protects it from contact with the vessel B, and is cooked in the ordinary manner. The vegetables are placed upon the plates C of the tray and may be cooked by steam; or when a sufficient quantity of water is used to cover the plates the vegetables may be boiled.

By having two or more plates in the tray a variety of vegetables may be prepared at the same time without the different kinds coming into contact with each other.

My device is especially adapted for use in cooking pot-pies, dumplings, &c., in preparing which the meat is placed upon the bottom plate or receptacle in the same manner as when vegetables are to be cooked, and the masses of dough are arranged upon the plates C, the distance between such plates being sufficient to allow for the rise of the dough. In this way the upper row or layer is prevented from weighting down the lower layer and making the same heavy.

When the article that is being prepared has been sufficiently cooked, the tray may be easily removed from the vessel by the bail and its contents removed. When the tray has been removed, access can be readily had to the lower part of the vessel. The arms which support the removable tray are arranged on the periphery of the bottom plate, and as they fit the side of the vessel the interior of the same is left entirely free from any obstruction and an article approximately the size of the bottom of the vessel may be cooked entire.

By having the tray removable from the bottom plate or receptacle articles that are quickly cooked may be placed on the tray, while those requiring a longer time in preparation may be placed on the bottom plate and remain undisturbed when the tray, with its contents, is removed.

When desired, the arms $A^2$ may be united in one continuous wall rising from the periphery of the receptacle and forming the side of the same.

Cooking-vessels have heretofore been provided with perforated receptacles supported on racks and like devices, and I do not broadly claim such matters.

What I claim as new, and desire to secure by Letters Patent, is—

1. The combination, with a cooking-vessel, of a perforated receptacle conforming in shape to the bottom of said vessel and provided with feet to separate it from the same at and near the bottom, the top of said receptacle fitting the vessel, and two tray-supports adapted to rest on the top of the receptacle and connected by bent wires on each side, extending above the upper tray in the form of a loop and adapted to receive a bail, whereby the bottom receptacle conforms, practically, to the shape of the vessel and the trays are movably supported thereon, substantially as set forth.

2. In a cooking utensil, the perforated trays secured together by bent or U-shaped wires, which extend above said trays and form ears for the reception of a bail, and said bail, substantially as set forth.

In testimony whereof I have hereunto set my hand this 2d day of October, 1890.

SOPHIA H. MITCHELL.

Witnesses
FRANK C. CURTIS,
CHAS. L. ALDEN.